United States Patent [19]

Kim

[11] Patent Number: 5,754,256
[45] Date of Patent: May 19, 1998

[54] AUDIO/VIDEO CONNECTION APPARATUS FOR AUDIO/VIDEO SYSTEM

[75] Inventor: Jeong Yeol Kim, Kyungki-Do, Rep. of Korea

[73] Assignee: Goldstar Co., Ltd., Seoul, Rep. of Korea

[21] Appl. No.: 735,379

[22] Filed: Oct. 21, 1996

Related U.S. Application Data

[63] Continuation of Ser. No. 357,168, Dec. 13, 1994, abandoned.

[30] Foreign Application Priority Data

Apr. 1, 1994 [KR] Rep. of Korea ............ 6942/1994

[51] Int. Cl.$^6$ .................................. H04N 5/268
[52] U.S. Cl. .................................. 348/706
[58] Field of Search ............... 348/705, 706, 348/722, 725; 455/3.1, 133; H04N 5/268

[56] References Cited

U.S. PATENT DOCUMENTS 4,575,759  3/1986  Griepertrog et al. ............ 348/706
4,581,645  4/1986  Beyers, Jr. .................... 348/705
4,638,181  1/1987  Deiss ........................... 348/706
4,808,992  2/1989  Beyers, Jr. et al. ............. 348/706
5,255,097  10/1993  Spiero et al. ................. 348/706

*Primary Examiner*—Michael H. Lee

[57] ABSTRACT

An audio/video connection apparatus for an audio/video system having a television receiver, an audio amplifier and a plurality of components. The audio/video connection apparatus includes at least one common video connection line for connecting a television receiver to a plurality of components so that video signals from the television receiver can be inputted to the plurality of components; and at least one common audio connection line for connecting an audio amplifier to the plurality of components so that audio signals from the audio amplifier can be inputted to the plurality of components, and so that video and audio signals can be inputted and outputted through the common lines to/from the components, thereby reducing the number of the output/input terminals and lines. The use of the common lines avoids increasing the number of input/output terminals and lines when the connected audio and video components are increased in number and permits, for example, recording from a first VCR to a second VCR while watching the program of the first VCR on a display unit.

8 Claims, 4 Drawing Sheets

AUDIO/VIDEO CONNECTION APPARATUS FOR AUDIO/VIDEO SYSTEM

This application is a continuation of application Ser. No. 08/357,168 filed on Dec. 13, 1994, now abandoned.

BACKGROUND OF THE INVENTION

1. Field of the Invention

The present invention relates in general to the switching of audio and video signals in an audio/video system (referred to hereinafter as an A/V system), and more particularly to an audio/video connection apparatus for the A/V system which makes a connection structure of audio/video input/output terminals simple employing a distributed processing.

2. Description of the Prior Art

Generally, an audio/video connection apparatus for an A/V system employs a centralized processing to process audio and video signals from components such as a video cassette recorder (referred to hereinafter as VCR), a laser disk player (referred to hereinafter as LDP), a compact disk graphics (referred to hereinafter as CDG), an AM/FM tuner, a deck, an audio amplifier, and etc. In the centralized processing, the video signals from the components are processed in a television (referred to hereinafter as TV) receiver and the audio signals from the components are processed in the audio amplifier. A problem with such a conventional audio/video connection apparatus for the A/V system will hereinafter be described with reference to FIGS. 1 and 2.

Referring to FIG. 1, there is shown the construction of the conventional audio/video connection apparatus for the A/V system. In this drawing, the reference numerals 101, 102, 103, 104, 105, 106 and 107 designate the TV receiver, the VCR, the LDP, the CDG, the AM/FM tuner, the deck and the audio amplifier, respectively. As shown in this drawing, when video and audio signals from the TV receiver 101 are to be recorded in the VCR 102, they are outputted from a video/audio output terminal OUT1 of the TV receiver 101 and then inputted through a line LN1 to an input terminal IN1 of the VCR 102. In the case where video and audio signals from the VCR 102 are to be reproduced in the TV receiver 101, they are outputted from an output terminal OUT2 of the VCR 102 and then inputted through a line LN2 to an input terminal IN2 of the TV receiver 101.

When a video signal from the LDP 103 is to be reproduced in the TV receiver 101, it is outputted from an output terminal OUT3 of the LDP 103 and then inputted through a line LN3 to an input terminal IN3 of the TV receiver 101. In the case where a video signal from the CDG 104 is to be reproduced in the TV receiver 101, it is outputted from an output terminal OUT4 of the CDG 104 and then inputted through a line LN4 to an input terminal IN4 of the TV receiver 101.

When an audio signal from the audio amplifier 107 is to be recorded in the deck 106, it is outputted from an output terminal OUT5 of the audio amplifier 107 and then inputted through a line LN5 to an input terminal IN5 of the deck 106. In the case where an audio signal from the deck 106 is to be reproduced in the audio amplifier 107, it is outputted from an output terminal OUT6 of the deck 106 and then inputted through a line LN6 to an input terminal IN6 of the audio amplifier 107. As a result, the audio signal from the deck 106 is reproduced through speakers 108. When an audio signal from the AM/FM tuner 105 is to be reproduced in the audio amplifier 107, it is outputted from an output terminal OUT7 of the AM/FM tuner 105 and then inputted through a line LN7 to an input terminal IN7 of the audio amplifier 107. As a result, the audio signal from the AM/FM tuner 105 is reproduced through the speakers 108.

In the case where an audio signal from the CDG 104 is to be reproduced in the audio amplifier 107, it is outputted from an output terminal OUT8 of the CDG 104 and then inputted through a line LN8 to an input terminal IN8 of the audio amplifier 107. As a result, the audio signal from the CDG 104 is reproduced through the speakers 108. When an audio signal from the LDP 103 is to be reproduced in the audio amplifier 107, it is outputted from an output terminal OUT9 of the LDP 103 and then inputted through a line LN9 to an input terminal IN9 of the audio amplifier 107. As a result, the audio signal from the LDP 103 is reproduced through the speakers 108. In the case where the audio signal from the VCR 102 is to be reproduced in the audio amplifier 107, it is outputted from an output terminal OUT10 of the VCR 102 and then inputted through a line LN10 to an input terminal IN10 of the audio amplifier 107. As a result, the audio signal from the VCR 102 is reproduced through the speakers 108. When the audio signal from the TV receiver 101 is to be reproduced in the audio amplifier 107, it is outputted from an output terminal OUT11 of the TV receiver 101 and then inputted through a line LN11 to an input terminal IN11 of the audio amplifier 107. As a result, the audio signal from the TV receiver 101 is reproduced through the speakers 108. On the other hand, in the case where the audio signal from the audio amplifier 107 is to be recorded in the VCR 102, it is outputted from an output terminal OUT12 of the audio amplifier 107 and then inputted through a line LN12 to an input terminal IN12 of the VCR 102.

In FIG. 1, the reference numeral LN13 designates a line for transmitting bidirectionally signals other than the audio and video signals, or control signals through input/output terminals of the components. The line LN13 is connected in common to an input/output terminal IO1 of the TV receiver 101, an input/output terminal IO2 of the VCR 102, an input/output terminal IO3 of the LDP 103, an input/output terminal IO4 of the CDG 104, an input/output terminal IO5 of the AM/FM tuner 105, an input/output terminal IO6 of the deck 106 and an input/output terminal IO7 of the audio amplifier 107.

Referring to FIG. 2, there is shown a construction of a conventional signal switching unit 140 which is provided in video output means or audio output means to selectively output a video signal and/or an audio signal. The video signals and/or the audio signals IN20-INM from the components are inputted to the signal switching unit 140 through input buffers 110-M provided in the video output means or the audio output means. Upon inputting the video signals and/or the audio signals, the signal switching unit 140 outputs selectively the inputted signals to an internal buffer 120 in the video output means or the audio output means or to output terminals OUT20-OUTN through output buffers 130-N which are provided.

As mentioned above, the conventional audio/video connection apparatus for the A/V system employs the centralized processing in which the audio and video signals are inputted and outputted to/from the TV receiver 101 and the audio amplifier 107. For this reason, the components require many input/output terminals and lines to interconnect the audio/video input/output terminals. Also, as the components are increased in number, corresponding input/output terminals and lines must be further provided. As a result, the TV receiver 101 and the audio amplifier 107 require more input/output terminals and lines with an increase in the number of the components, resulting in a complexity in the construction.

SUMMARY OF THE INVENTION

Therefore, the present invention has been made in view of the above problem, and it is an object of the present invention to provide an audio/video connection apparatus for an A/V system which switches audio and video signals employing a distributed processing in order to make a connection structure of audio/video input/output terminals simple.

In accordance with the present invention, the above and other objects can be accomplished by provision of an audio/video connection apparatus for an audio/video system with a television receiver, an audio amplifier and a plurality of components, comprising at least one common video connection line for connecting said television receiver to said plurality of components so that it can input video signals from said plurality of components; and at least one common audio connection line for connecting said audio amplifier to said plurality of components so that it can input audio signals from said plurality of components.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
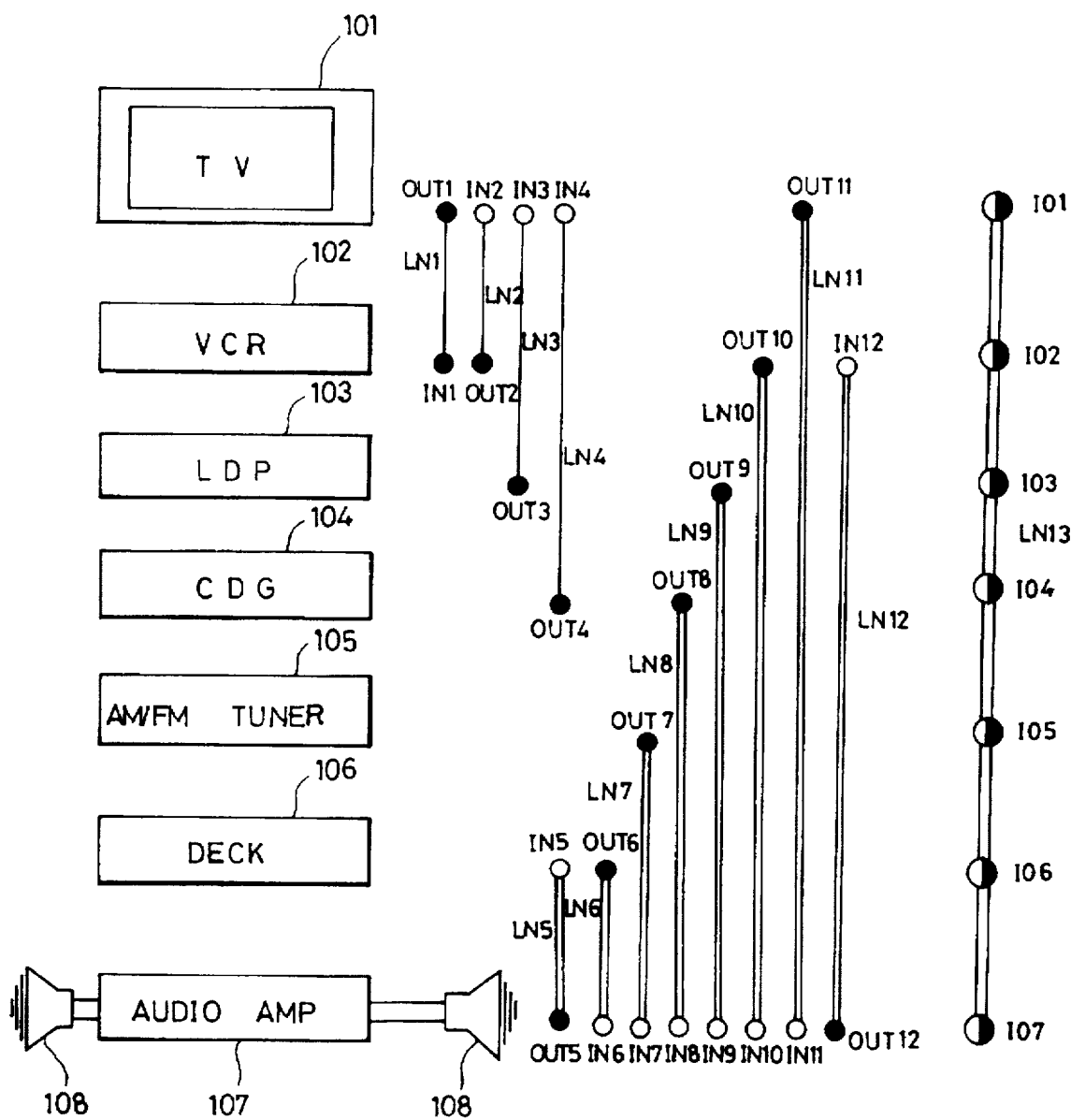
FIG. 1 is a view illustrating a construction of a conventional audio/video connection apparatus for an A/V system.
Figure 2:
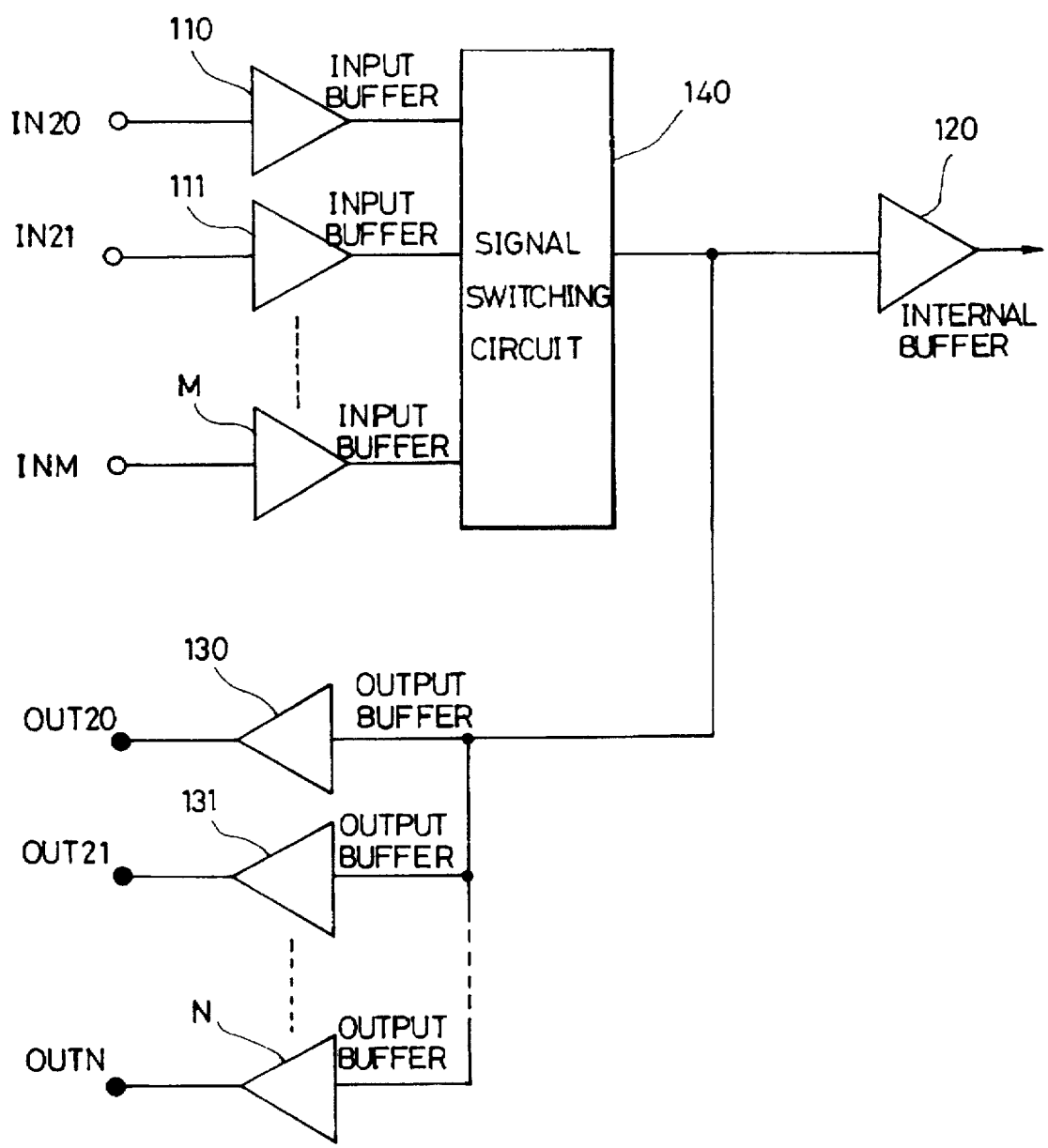
FIG. 2 is a view illustrating a construction of a signal switching unit in FIG. 1.
Figure 3:
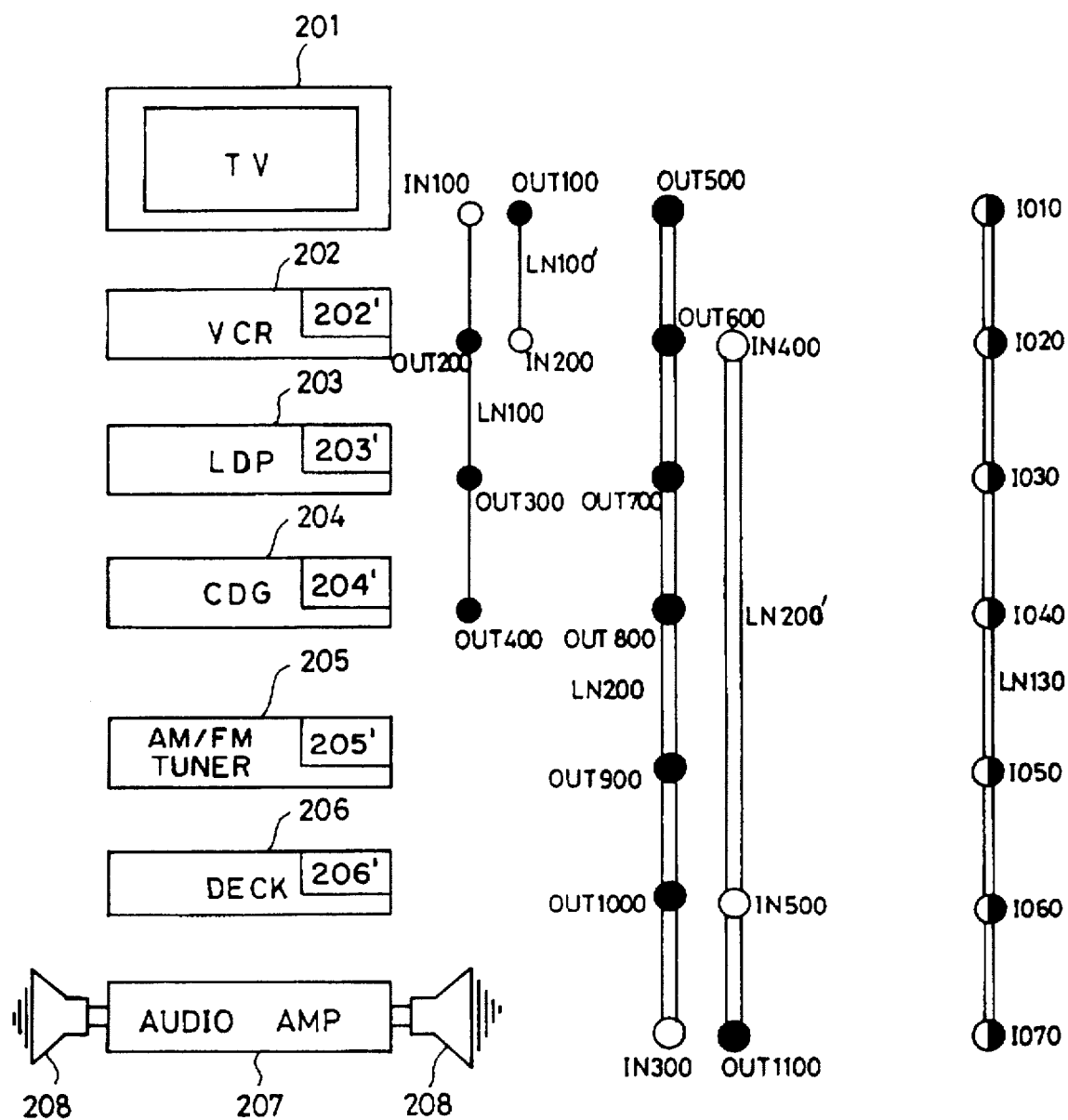
FIG. 3 is a view illustrating a construction of an audio/video connection apparatus for an A/V system in accordance with the present invention.

Referring to FIG. 3, there is shown a construction of an audio/video connection apparatus for an A/V system in accordance with the present invention. As shown in this drawing, in the case where a video signal from a VCR 202 is to be reproduced in a TV receiver 201, it is outputted from an output terminal OUT200 of the VCR 202 and then inputted through a common line LN100 to an input terminal IN100 of the TV receiver 201. When a video signal from an LDP 203 is to be reproduced in the TV receiver 201, it is outputted from an output terminal OUT300 of the LDP 203 and then inputted through the common line LN100 to the input terminal IN100 of the TV receiver 201. In the case where a video signal from a CDG 204 is to be reproduced in the TV receiver 201, it is outputted from an output terminal OUT400 of the CDG 204 and then inputted through the common line LN100 to the input terminal IN100 of the TV receiver 201. When a video signal from the TV receiver 201 is to be recorded in the VCR 202, it is outputted from an output terminal OUT100 of the TV receiver 201 and then inputted through a line LN100' to an input terminal IN200 of the VCR 202.

On the other hand, in the case where an audio signal from the TV receiver 201 is to be reproduced in an audio amplifier 207, it is outputted from an output terminal OUT500 of the TV receiver 201 and then inputted through a common line LN200 to an input terminal IN300 of the audio amplifier 207. As a result, the audio signal from the TV receiver 201 is reproduced through speakers 208. When an audio signal from the VCR 202 is to be reproduced in the audio amplifier 207, it is outputted from an output terminal OUT600 of the VCR 202 and then inputted through the common line LN200 to the input terminal IN300 of the audio amplifier 207. As a result, the audio signal from the VCR 202 is reproduced through the speakers 208. In the case where an audio signal from the LDP 203 is to be reproduced in the audio amplifier 207, it is outputted from an output terminal OUT700 of the LDP 203 and then inputted through the common line LN200 to the input terminal IN300 of the audio amplifier 207. As a result, the audio signal from the LDP 203 is reproduced through the speakers 208. When an audio signal from the CDG 204 is to be reproduced in the audio amplifier 207, it is outputted from an output terminal OUT800 of the CDG 204 and then inputted through the common line LN200 to the input terminal IN300 of the audio amplifier 207. As a result, the audio signal from the CDG 204 is reproduced through the speakers 208.

When an audio signal from an AM/FM tuner 205 is to be reproduced in the audio amplifier 207, it is outputted from an output terminal OUT900 of the AM/FM tuner 205 and then inputted through the common line LN200 to the input terminal IN300 of the audio amplifier 207. As a result, the audio signal from the AM/FM tuner 205 is reproduced through the speakers 208. In the case where an audio signal from a deck 206 is to be reproduced in the audio amplifier 207, it is outputted from an output terminal OUT1000 of the deck 206 and then inputted through the common line LN200 to the input terminal IN300 of the audio amplifier 207. As a result, the audio signal from the deck 206 is reproduced through the speakers 208. On the other hand, when an audio signal from the audio amplifier 207 is to be recorded in the VCR 202, it is outputted from an output terminal OUT1100 of the audio amplifier 207 and then inputted through a common line LN200' to an input terminal IN400 of the VCR 202. Also, when the audio signal from the audio amplifier 207 is to be recorded in the deck 206, it is outputted from the output terminal OUT1100 of the audio amplifier 207 and then inputted through the common line LN200' to an input terminal IN500 of the deck 206.

In FIG. 3, the reference numeral LN130 designates a line for transmitting bidirectionally signals other than the audio and video signals, or control signals through input/output terminals of the components. The line LN 130 is connected in common to an input/output terminal IO10 of the TV receiver 201, an input/output terminal IO20 of the VCR 202, an input/output terminal IO30 of the LDP 203, an input/output terminal IO40 of the CDG 204, an input/output terminal IO50 of the AM/FM tuner 205, an input/output terminal IO60 of the deck 206 and an input/output terminal IO70 of the audio amplifier 207. The VCR 202, the LDP 203, the CDG 204, the AM/FM tuner 205, and the DEC 206 include recognition circuits 202', 203', 204', 205', and 206', respectively, for analyzing transmission and reception of data to/from the TV receiver 201 or the audio amplifier 207 in order to discriminate whether each of these components will output a video signal or audio signal to the TV receiver or the audio amplifier through the common line LN100, the line LN100', the common line LN200, or the common line LN200'.

Figure 4A:
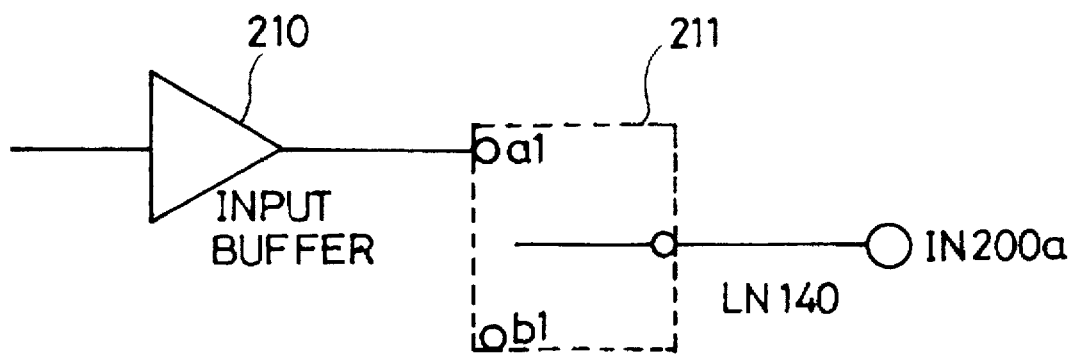
FIGS. 4A and 4B are views illustrating constructions of input and output switches in FIG. 3, respectively.
Figure 4B:
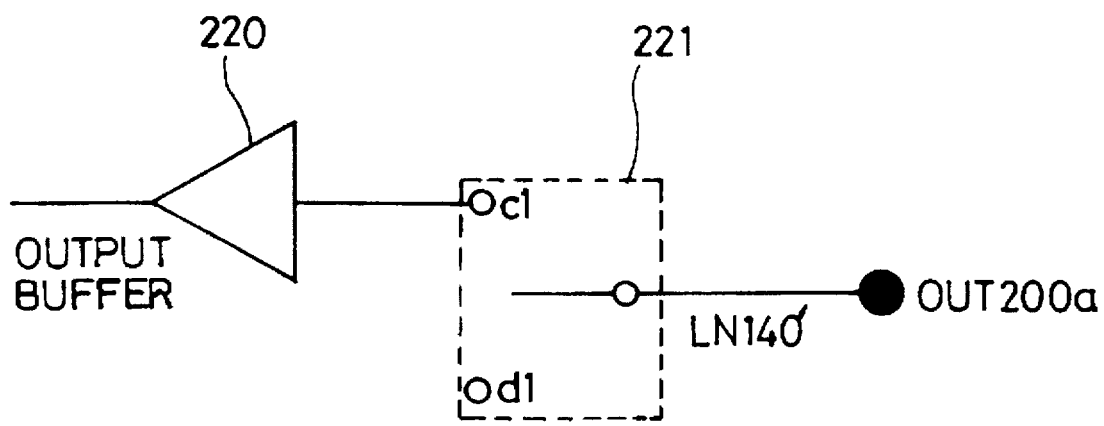

FIGS. 4A and 4B are views illustrating constructions of input and output switches 211 and 221 provided in each component to connect desired ones of the video and audio signals inputted and outputted through the common lines LN100, LN200 and LN130 and mute the remaining signals, respectively.

FIG. 4A shows the construction of the input switch 211 for connecting or muting the video signal or the audio signal inputted to the corresponding component. As shown in this drawing, an input buffer 210 inputs an external video or audio signal and transfers the inputted video or audio signal to the input switch 211. The input switch 211 includes input and mute terminals a1 and b1 to output selectively the video signal or the audio signal transferred by the input buffer 210 to an input terminal IN200a according to a user's selection. For example, when the video signal or the audio signal transferred by the input buffer 210 is to be inputted according to the user's selection, a line LN140 is connected to the input terminal a1 of the input switch 211. On the contrary, when the video signal or the audio signal transferred by the input buffer 210 is to be muted according to the user's selection, the line LN140 is connected to the mute terminal b1 of the input switch 211.

FIG. 4B shows the construction of the output switch 221 for connecting or muting the video signal or the audio signal outputted from the corresponding component. As shown in this drawing, the output switch 221 includes input and mute terminals c1 and d1 to output selectively a video or audio signal outputted from an output terminal OUT200a of the corresponding component to an output buffer 220 according to a user's selection. For example, when a line LN140' is connected to the input terminal c1 of the output switch 221, the video signal or the audio signal is outputted to a different component through the output buffer 220. On the contrary, when the line LN140' is connected to the mute terminal d1 of the output switch 221, the video signal or the audio signal is muted.

As apparent from the above description, according to the present invention, the video and audio signals are inputted and outputted through the common lines to/from the components, resulting in a significant reduction in the number of the input/output terminals and lines. The use of the common lines results in no necessity for increasing the number of the input/output terminals and lines although the components are increased in number. Therefore, the audio/video connection apparatus for the A/V system has the effect of making a construction of a multimedia system using many components simple and reducing the cost thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An audio/video connection apparatus for an audio/video system with a television receiver, an audio amplifier and a plurality of components, comprising:

a first video connection line for commonly connecting respective video output terminals of said plurality of components capable of outputting a video signal to a video input terminal of said television receiver;

a second video connection line for connecting a video output terminal of said television receiver to a video input terminal of a video recording and reproducing unit;

a first audio connection line for commonly connecting respective audio output terminals of said television receiver and said plurality of components capable of outputting an audio signal to an audio input terminal of said audio amplifier;

a second audio connection line for commonly connecting an audio output terminal of said audio amplifier capable of outputting an audio signal, to audio input terminals of said video recording and reproducing unit and an audio recording deck; and a communication line for transmitting data between said television receiver, said audio amplifier and said plurality of components for indicating when the video and audio signals are being outputted via said first and second video connection lines and said first and second audio connection lines, wherein each of said plurality of components includes an input switch having an input terminal and an input mute terminal for performing a first switching operation between an input operation and a mute operation according to a user's selection, wherein the input operation allows receipt of a video signal by the corresponding component through said second video connection line and the mute operation prevents receipt of the video signal, being transmitted through said second video connection line, by the corresponding component based on the user's selection, and wherein each of said plurality of components includes an output switch having an output terminal and an output mute terminal for performing a second switching operation between an output operation and a mute operation according to the user's selection, wherein the output operation allows transmission of the video signal or the audio signal from the corresponding component to said television receiver or said audio amplifier through said first video connection line or said first audio connection line and the mute operation prevents transmission of the video signal to the audio signal from the corresponding component, based on the user's selection.

2. An audio/video connection apparatus for an audio/video system as set forth in claim 1, wherein each of said plurality of components includes recognition means for analyzing transmission and reception data to/from said television receiver or said audio amplifier to discriminate whether the corresponding component will output the video signal or the audio signal to said television receiver or said audio amplifier through said first video connection line or said first audio connection line.

3. A system for selectively operating a plurality of electronic components including a TV receiver, an audio amplifier, a first electronic component and a second electronic component, the system comprising:

a first video connection line commonly connecting the plurality of electronic components to the television receiver for selectively transmitting a video signal output from the electronic components to the television receiver;

a second video connection line connecting the television receiver to the first electronic component for transmitting a video signal output from the television receiver to the first electronic component; and a communication line transmitting control data between the television receiver, the audio amplifier and the plurality of electronic components so as to control operations therebetween, wherein each of the electronic components includes an input switch having an input terminal and an input mute terminal for performing a first switching operation between an input operation and a mute operation according to a user's selection, wherein the input operation allows receipt of the video signal output from the television receiver to the first electronic component through the second video connection line and the mute operation prevents receipt of the video signal from the television receiver being transmitted through the second video connection line, by the first electronic component based on the user's selection, and wherein each of the electronic components includes an output switch having an output terminal and an output terminal for performing a second switching operation between an output operation and a mute operation accordion to the user's selection, wherein the output operation allows transmission of the video signal from the first electronic component the television receiver through said first video connection line and the mute operation prevents transmission of the video signal from the first electronic component, based on the user's selection.

4. The system of claim 3, wherein the first electronic component is a video cassette recorder.

5. The system of claim 3, further comprising:

a first audio connection line commonly connecting audio output terminals of the TV receiver and the electronic components to the audio amplifier for selectively transmitting an audio signal from the television receiver and the electronic components to the audio amplifier; and a second audio connection line commonly connecting the audio amplifier to the first and second electronic components for selectively transmitting the audio signal from the audio amplifier to the first and second electronic components.

6. The system of claim 5, wherein the second electronic component is a deck.

7. The system of claim 6, wherein the plurality of electronic components includes a laser disk player, a compact disk graphics, and an AM/FM tuner.

8. The system of claim 7, wherein each of the plurality of electronic components includes a recognition circuit for analyzing transmission and reception of data to and from the television receiver or the audio amplifier to determine whether the corresponding electronic component will output the video signal or the audio signal to the television receiver or the audio amplifier through the first video connection line or the first audio connection line.

* * * * *